United States Patent
Biggs et al.

(10) Patent No.: US 9,684,589 B2
(45) Date of Patent: Jun. 20, 2017

(54) MEMORY MODULE INCLUDING MEMORY RESISTORS

(71) Applicant: Hewlett-Packard Development Company, L.P., Houston, TX (US)

(72) Inventors: Kent E Biggs, Houston, TX (US); Chi W So, Houston, TX (US); Michael A Provencher, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 14/432,245

(22) PCT Filed: Nov. 29, 2012

(86) PCT No.: PCT/US2012/067137
§ 371 (c)(1),
(2) Date: Mar. 30, 2015

(87) PCT Pub. No.: WO2014/084837
PCT Pub. Date: Jun. 5, 2014

(65) Prior Publication Data
US 2015/0254175 A1    Sep. 10, 2015

(51) Int. Cl.
*G06F 12/02*    (2006.01)
*G06F 13/16*    (2006.01)
(Continued)

(52) U.S. Cl.
CPC ........ *G06F 12/0238* (2013.01); *G06F 9/4401* (2013.01); *G06F 9/45558* (2013.01); *G06F 13/1636* (2013.01); *G06F 2009/45583* (2013.01); *G06F 2212/202* (2013.01); *G06F 2212/251* (2013.01)

(58) Field of Classification Search
CPC ............... G06F 12/0238; G06F 9/4401; G06F 9/45558; G06F 13/1636
See application file for complete search history.

(56) References Cited

U.S. PATENT DOCUMENTS

| 7,685,635 B2 | 3/2010 | Vega et al. |
| 8,028,110 B1 | 9/2011 | Wigmore |

(Continued)

FOREIGN PATENT DOCUMENTS

| CN | 101019107 | 8/2007 |
| TW | 201243580 A1 | 11/2012 |

OTHER PUBLICATIONS

International Search Report and Written Opinion, International Application No. PCT/US2012/067137, Date of Mailing: May 30, 2013, pp. 1-8.

(Continued)

*Primary Examiner* — Ryan Bertram
(74) *Attorney, Agent, or Firm* — HP Inc. Patent Department (57) ABSTRACT

A computing device includes, a memory component, a memory module including memory resistors, and a virtualization module. The virtualization module intercepts communication between an application and a memory component and directs the communication to the memory module including memory resistors. The virtualization module directs communication from the memory module to the application.

15 Claims, 5 Drawing Sheets

(51) Int. Cl.
G06F 9/455 (2006.01)
G06F 9/44 (2006.01)

(56) References Cited

U.S. PATENT DOCUMENTS

| | | | |
|---|---|---|---|
| 2004/0028063 | A1 | 2/2004 | Roy |
| 2008/0244096 | A1* | 10/2008 | Springfield ........... G06F 9/4416 710/5 |
| 2010/0042672 | A1* | 2/2010 | Lo .................... G06F 9/5077 709/203 |
| 2012/0011500 | A1 | 1/2012 | Faraboschi et al. |
| 2012/0036325 | A1 | 2/2012 | Mashtizadeh et al. |
| 2012/0047313 | A1* | 2/2012 | Sinha ................... G06F 12/08 711/6 |
| 2012/0088584 | A1 | 4/2012 | Mamtani |
| 2012/0124415 | A1 | 5/2012 | Borkenhagen |
| 2012/0127780 | A1 | 5/2012 | Strachan et al. |
| 2012/0133662 | A1 | 5/2012 | Morris |
| 2012/0246391 | A1* | 9/2012 | Meir ................... G06F 12/0246 711/103 |
| 2012/0254993 | A1 | 10/2012 | Sallam |

OTHER PUBLICATIONS

European Patent Office, Extended European Search Report for EP 12889100.9 dated May 4, 2016 (6 pages).

* cited by examiner

MEMORY MODULE INCLUDING MEMORY RESISTORS

BACKGROUND

When a computing device powers on, an operating system can be launched and used to manage components of the computing device, such as a random access memory and a storage component of the computing device. The operating system can receive commands and/or requests to read or write from applications and/or components of the computing device and direct the commands and/or requests to the main memory and the storage component.

BRIEF DESCRIPTION OF THE DRAWINGS

In the accompanying drawings, like numerals refer to like components or blocks. The following detailed description references the drawings, wherein.

DETAILED DESCRIPTION

A computing device includes a memory module with memory resistors. For the purposes of this application, the memory module is a hardware memory component of the computing device which includes memory resistors to receive and store data and/or information. A memory resistor is a non-volatile random access memory (NVRAM) which maintains a state of its resistance when power, such as a voltage and/or current, is applied and removed. Information, instructions, and/or data loaded onto the memory resistor remain on the memory resistor with or without the memory module receiving power.

A virtualization module can be launched in response to the computing device powering on. The virtualization module manages communication to and from the memory module with memory resistors. For the purposes of this application, the virtualization module is a virtual machine launched by a processor, a controller, and/or by a Basis Input/Output System (BIOS) of the computing device. The virtualization module operates as a layer between an application of the computing device and the memory module with memory resistors to manage communication between the application and the memory module. In one example, the virtualization module is a Type 1 Hypervisor executed by a processor and/or a controller.

The application can be an operating system of the computing device which attempts to communicate with a memory component of the computing device. The memory component can be a main memory, such as random access memory, and/or a storage component, such as a hard disk drive, of the computing device. In one implementation, the memory component can be a hardware component included on the computing device. In another implementation, the memory component is a virtualized memory component identified to the operating system as main memory and/or a storage component.

The virtualization module detects for communication from the application to a memory component. If communication is detected from the application, the virtualization module intercepts the communication and directs the communication to the memory module with memory resistors. For the purposes of this application, the communication includes a command and/or request to load and/or read data. The virtualization module also receives communication from the memory module with memory resistors and directs the communication to the application.

By using a virtualization module as a layer between the application and the memory module, the application can attempt to communicate with a memory component without being aware that the communication is being directed to and from the memory module including memory resistors. As a result, the memory module with memory resistors can operate as main memory and/or as a storage component for the computing device without modifying an architecture and/or code of the application. Additionally, the memory module with memory resistors can retain received data with or without receiving power. Further, using the virtualization module, firmware and/or drivers for components of the computing device are not modified for the application to communicate with the memory module including memory resistors.

Figure 1:
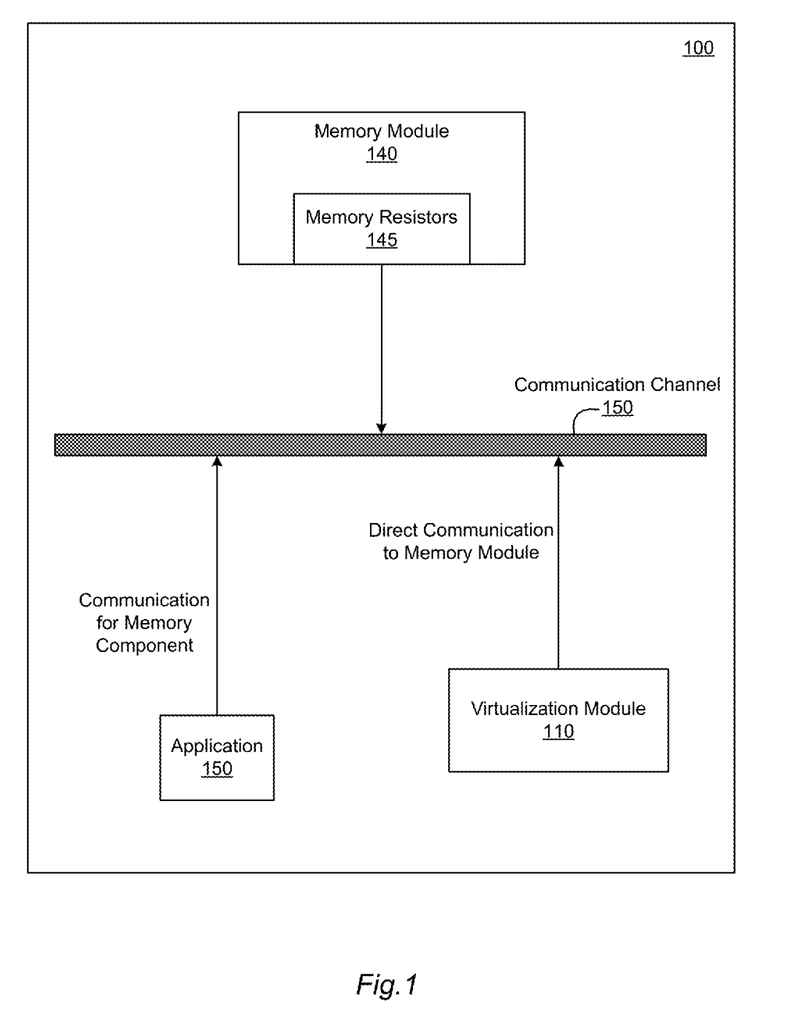
FIG. 1 illustrates a computing device with a memory module including memory resistors, a virtualization module, and an application according to an example.

FIG. 1 illustrates a computing device 100 with memory module 140, a virtualization module 110, and an application 150 according to an example. The computing device 100 can be a desktop, a workstation, a server, and/or an all-in-one system. In another implementation, the computing device 100 can be a notebook, a netbook, a tablet, a slate, a smart phone, an E (electronic)—Reader, and/or any additional computing device with a memory module 140 including memory resistors 145. The computing device 100 includes a memory module 140, a virtualization module 110, an application 140, and a communication channel 150 for the virtualization module 110 and/or components of the computing device 100 to communicate with one another.

The memory module 140 includes memory resistors (memristors) 145 to receive and store data. The data can include files, instructions, commands, and/or other types of information which can be loaded and/or read onto a memory resistor 145. For the purposes of this application, a memory resistor 145 is a non-volatile random access memory (NVRAM) which maintains a state of its resistance when power, such as a voltage and/or current, is applied and removed. As a result, information and/or data loaded onto the memory resistor 145 can remain on the memory resistor 145 with or without the memory module 140 receiving power. In one implementation, the memory module 145 is a flat memory component including memory resistors 145.

The memory module 145 is managed by a virtualization module 110 of the computing device 100. For the purposes of this application, the virtualization module 110 is a virtual machine launched by a processor, a controller, and/or by a Basis Input/Output System (BIOS) of the computing device 100. The virtualization module 110 operates as a layer between an application 150 of the computing device 100 and the memory module 140 and manages communication between the application 150 and the memory module 140. In one implementation, the virtualization module 110 is a Type 1 Hypervisor executed on a processor and/or a controller in response to the computing device 100 powering on.

The application 150 can be an operating system of the computing device to communicate with a memory component of the computing device 100. In another implementation, the application 150 can be an application launched by the operating system or the application 150 can be a firmware and/or a BIOS of the computing device 100. For the purposes of this application, a memory component includes a main memory, such as a Random Access Memory, and/or a non-volatile storage component, such as a hard disk drive of the computing device 100. In one implementation, the memory component is a hardware memory component including main memory and/or the storage component. In another implementation, the memory component is a virtual memory component identified to include virtual main memory and/or a virtual storage component.

When managing communication between the application 150 and the memory module 140, the virtualization module 110 initially detects for the application 150 issuing communication to a memory component of the computing device 100. The communication includes a read or write data request for the memory component and/or a command to manage data on the memory component. If the virtualization module 110 detects communication from the application 150, the virtualization module 110 intercepts the communication and directs the communication to the memory module 140.

In one implementation, the virtualization module 110 intercepts the communication for a main memory, such as a random access memory, and directs the communication to the memory module 140. Communication for a storage component is not intercepted by the virtualization module 110 and is received by the storage component. In another implementation, the virtualization module 110 intercepts communication for a storage component, such as a hard disk drive, and directs the communication to the memory module 140. Communication for the main memory is not intercepted and is passed to the main memory. In other implementations, the virtualization module 110 intercepts communication for both the main memory and the storage component and directs the communication to the memory module 140.

By directing the communication to the memory module 140, the virtualization module 110 utilizes the memory module 140 as a main memory and/or as a storage component of the computing device 100. The memory module 140 including memory resistors 145 can also provide a communication response when returning data. As the memory module 140 provides the communication, the virtualization module 110 receives the communication from the memory module 140 and directs the communication to the application 150.

If the memory module 140 is utilized as a main memory, the virtualization module 110 provides the communication as a main memory communication to the application 150. In another implementation, if the memory module 140 is utilized as a storage component, the virtualization module 110 provides the communication as a storage component communication to the application 150. In other implementations, if the memory module 140 is utilized as both a main memory and a storage component, the virtualization module 110 can initially identify whether the communication was specified for a main memory or for a storage component. The virtualization module 110 can then provide the corresponding communication to the application 150 as a main memory communication or as a storage component communication.

In one example, if the application 150 issues a write command to a memory component, the virtualization module 110 receives the command and the corresponding data to write. The virtualization module 110 directs the write command and the corresponding data onto the memory module 140. If the application 150 subsequently issues a request for the data from the memory component, the virtualization module 110 receives the request command and directs the request command to the memory module 140. The memory module 140 can fetch the requested data for the virtualization module 110 to supply the data to the application 150. In another implementation, the virtualization module 110 fetches the requested data from a location of the memory module 140 to provide to the application 150. As a result, the application 150 continues to operate as if it is communicating with a memory component without knowledge that the virtualization module 110 is directing the communication to and from the memory module 140 including memory resistors 145.

Figure 2:
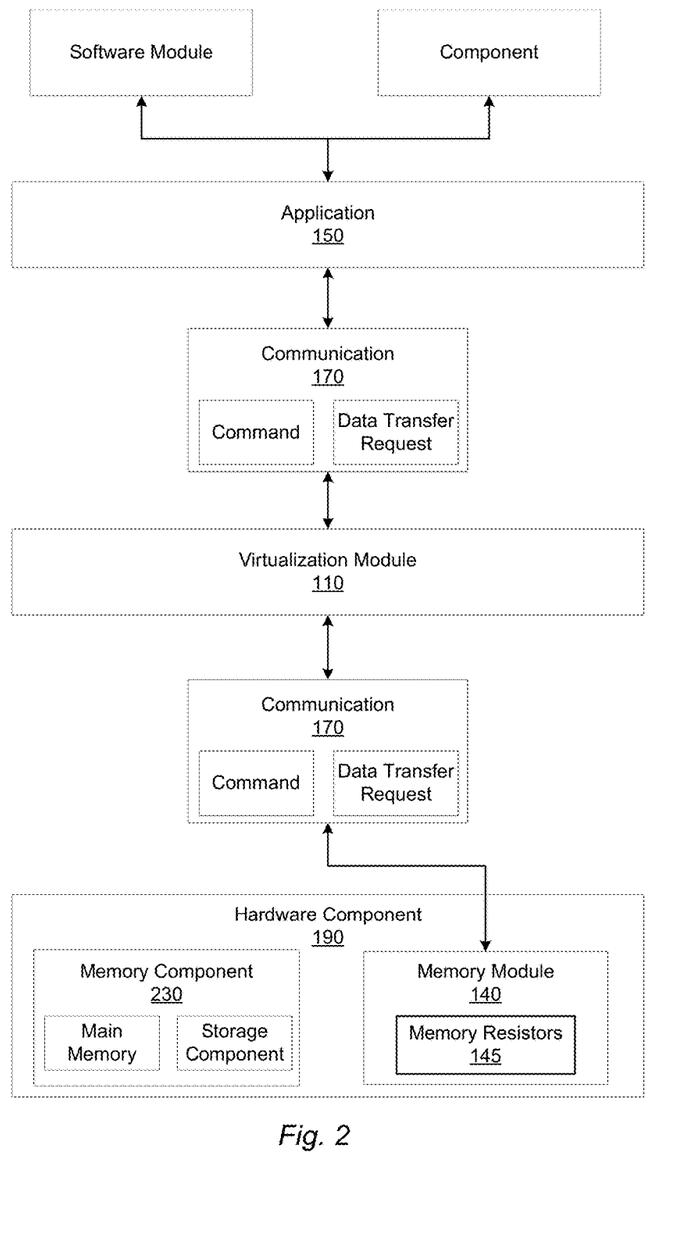
FIG. 2 illustrates a virtualization module managing communication to and from a memory module including memory resistors according to an example.

FIG. 2 illustrates a virtualization module 110 managing communication 170 to and from a memory module 140 including memory resistors 145 according to an example. The virtualization module 110 is a virtual machine executed by a processor and/or a controller of the computing device. The controller and/or the processor can be a semiconductor-based microprocessor, an integrated circuit (IC), or any other component suitable for executing the virtual module 110 in response to the computing device powering on.

In one implementation, the virtualization module 110 is a Type 1 hypervisor of the computing device. In another implementation, the virtualization module 110 can include other types of hypervisors or the virtualization module 110 can be BIOS or a firmware launched in response to the computing device power on. The computing device can power on to a power on state, such as a S0 power state, from a soft off or a mechanical off state, such as a G3 or S5 power state. In another example, powering on can include the computing device transitioning from the soft or mechanical off state to a low power state, such as a S3 or S4 power state.

Once the virtualization module 110 has been launched, the virtualization module 110 operates as a layer between an application 150 and hardware components 190 of the computing device. By operating as in intermediate layer, the virtualization module 110 is not visible to the application 150 and the application 150 continues to operate as if it is communicating with a memory component 230, without knowledge that communication 170 is being directed to and from a memory module 140 including memory resistors 145. In one implementation, the application 150 can be an operating system of the computing device which sends and receives communication 170 to the memory component 230. In other implementations, the application 150 can be a firmware, BIOS, and/or any additional application of the computing device.

The application 150 issues communication 170 towards the memory component 230 of the computing device. As shown in FIG. 2, the memory component 230 includes memory components of the computing device, such as a main memory and/or a storage component of the computing device. The main memory includes random access memory and the storage component includes a non-volatile storage component. In another implementation, the memory component 230 can include a virtual main memory and/or a virtual storage component created by the virtualization module 110. The virtualization module 110 identifies the virtual memory component to the application 150 as a main memory and a storage component of the computing device.

As shown in FIG. 2, the communication 170 includes commands and/or requests to read or write data to and from a memory component 230 of the computing device. The commands and/or requests can be sent as instructions in conjunction with and/or separately from information and data. In one implementation, the communication 170 is received directly from the application 150. In another implementation, the communication 170 can also be received from another application operating on top of the application 150 or from a hardware component managed by the application 150. The communication 170 can include a header, tag, or file which specifies whether the communication 170 from the application 150 is for a main memory or for a storage component of the computing device.

The virtualization module 110 intercepts communication 170 from the application 150 and directs the communication 170 to the memory module 140. As noted above, the memory module 140 is a hardware component including memory resistors 145 to store data, instructions, and/or information with or without power. The memory module 140 can include one or more dual in-line memory modules (DIMMs) including one or more memory resistors 145. If the memory module 140 includes more than one DIMM, the virtualization module 110 can specify whether each corresponding DIMM of memory resistors 145 is to be used as a main memory or as a storage component of computing device. In another implementation, the memory resistors 145 of the memory module 140 are organized and accessed with a flat memory addressing paradigm. As a result, the virtualization module 110 can directly access each location and address of the memory module 140 without switching memory segmentation and/or paging schemes.

In one implementation, when writing to and from the memory module 140, the virtualization module 110 creates a table, list, and/or database including addresses for each memory resistor 145 included in the memory module 140. The table, list, and/or database further include corresponding instructions and/or commands to execute on the addresses. As the virtualization module 110 receives commands, requests, and/or data from the application 150, the virtualization module 110 can execute the instruction or command on a corresponding location of the memory resistors 145 on the memory module 140.

In one implementation, an address of the main memory and/or of the storage component to execute the command or request on is specified by the application 150. The virtualization module 110 executes the corresponding command and/or request at a corresponding location of the memory resistors 145. In another implementation, the address is not specified and the virtualization module 110 manages which locations of the memory resistors 145 on the memory module 140 to execute the corresponding command and/or instruction on. The virtualization module 110 can also access a header or tag from the communication 170 to identify whether the communication 170 is specified for a main memory or for a storage component of the computing device. The virtualization module 110 can mark a field of an entry in the table, list, and/or database corresponding to the location to identify whether the corresponding memory resister 145 location is used as main memory and/or as a storage component.

Figure 3:
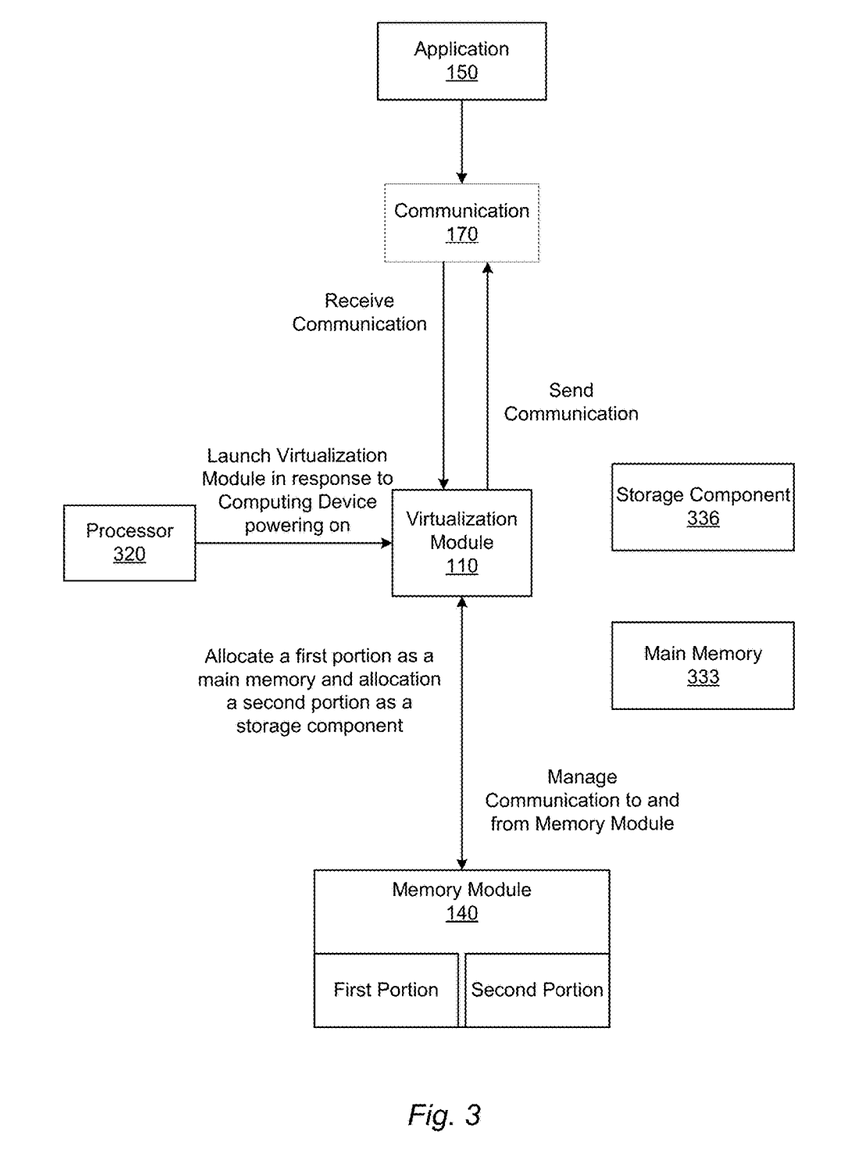
FIG. 3 illustrates a virtualization module managing a memory module and managing communication according to an example.

FIG. 3 illustrates a virtualization module 110 managing a memory module 140 and managing communication 170 according to an example. In one implementation, in response to launching, the virtualization module 110 allocates a first portion of the memory module 140 as a main memory of the computing device and allocates a second portion of the memory module 140 as a storage component of the computing device. A size of the first portion and a size of the second portion can be based on a size of an existing main memory component 333 and an existing storage component 336 included on the computing device. In another implementation, the size of the first portion and/or the size of the second portion can be specified by a user of the computing device, a manufacturer of the computing device, the processor 320, and/or BIOS of the computing device.

The virtualization module 110 can also monitor a usage and capacity of the first portion and the second portion. If the first portion begins to reach a full capacity, the virtualization module 110 can increase a size of the first portion by allocating space from the second portion for the first portion. Likewise, if the second portion begins to reach a full capacity, the virtualization module 110 can increase a size of the second portion by allocating space from the first portion for the first portion. The virtualization module 110 can continue to allocate space between the first portion and the second portion as the application 150 sends and receives communication for the virtualization module 110 to intercept.

The virtualization module 110 detects for communication from the application 150 directed toward a main memory and/or a storage component of the computing device. The virtualization module 110 receives the communication 170 and directs the communication 170 towards the memory module 140. As noted above, the communication 170 from the application 150 can include a header, tag, and/or file which specifies whether the communication 150 is for a main memory or for a storage component. If the communication 170 is specified for the main memory, the virtualization application 110 directs the communication 170 to the first portion of the memory module 140. If the communication 170 is specified for the storage component, the virtualization application 110 directs the communication 170 to the second portion of the memory module 140.

Likewise, when providing communication 170 from the memory module 140 to the application 150, the virtualization module 110 can identify whether the communication 170 is provided form the first portion or the second portion of the memory module 140. If the communication 170 is provided from the first portion, the virtualization module 110 provides the communication 170 as a main memory communication to the application 150. The virtualization module 110 can also mark a header, tag, and/or file to specify that the communication 170 is a main memory communication. If the communication 170 is provided from the second portion, the virtualization module 110 provides the communication 170 as a storage component communication to the application 150. The virtualization module 110 can also mark a header, tag, and/or file to specify that the communication 170 is a storage component communication.

In one implementation, the virtualization module 110 can further include translating the communication 170 from a first communication protocol to a second communication protocol. The first communication protocol is a communication protocol used by the main memory and/or the storage component when receiving or sending commands, requests, and/or data. The second communication protocol is a communication protocol used by memory resistors of the memory module 140 for sending and receiving commands, requests, and/or data. If the memory module 140 responds to a request and transmits commands, requests, and/or data to the application 150, the virtualization module 110 can receive the communication and translate the communication from the second communication protocol to the first communication protocol.

Figure 4:
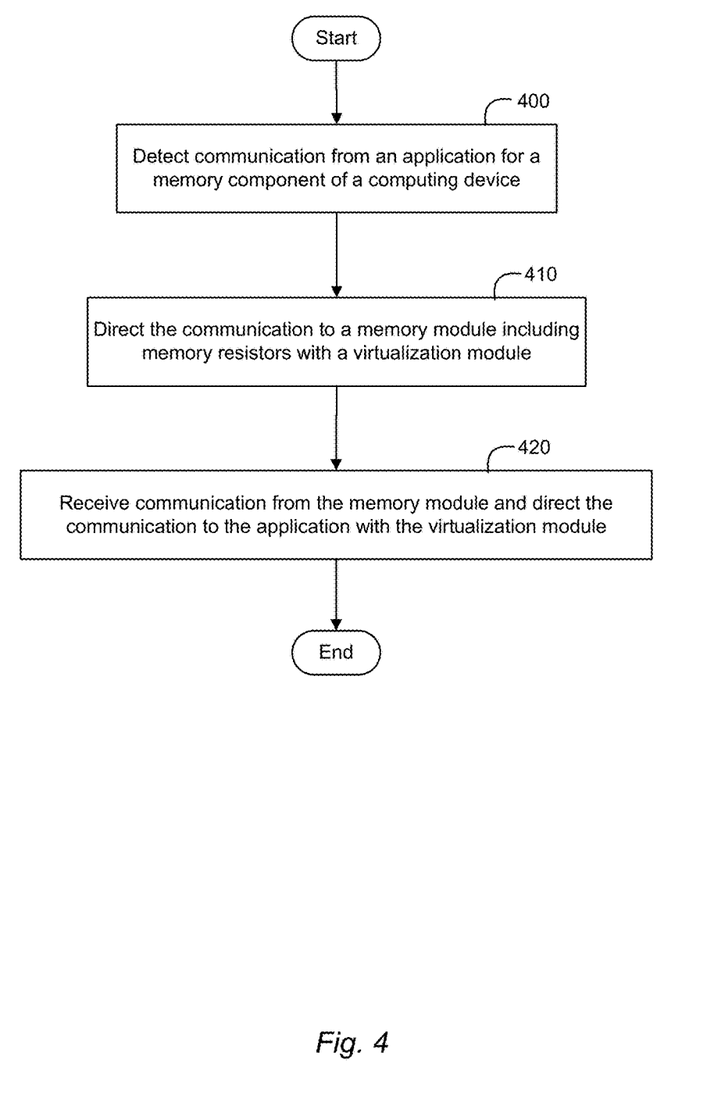
FIG. 4 is a flow chart illustrating a method for managing memory according to an example.

FIG. 4 is a flow chart illustrating a method for managing memory according to an example. The virtualization module detects for communication from an application directed to a memory component, such as a main memory and/or a storage component, of the computing device at 400. The communication includes commands and/or requests for data from the application. If communication is detected, the virtualization module intercepts the communication and directs the communication to a memory module including memory resistors at 410. The virtualization module also detects communication from the memory module including memory resistors and directs the communication to the application if received at 420. The method is then complete. In other embodiments, the method of FIG. 4 includes additional steps in addition to and/or in lieu of those depicted in FIG. 4.

Figure 5:
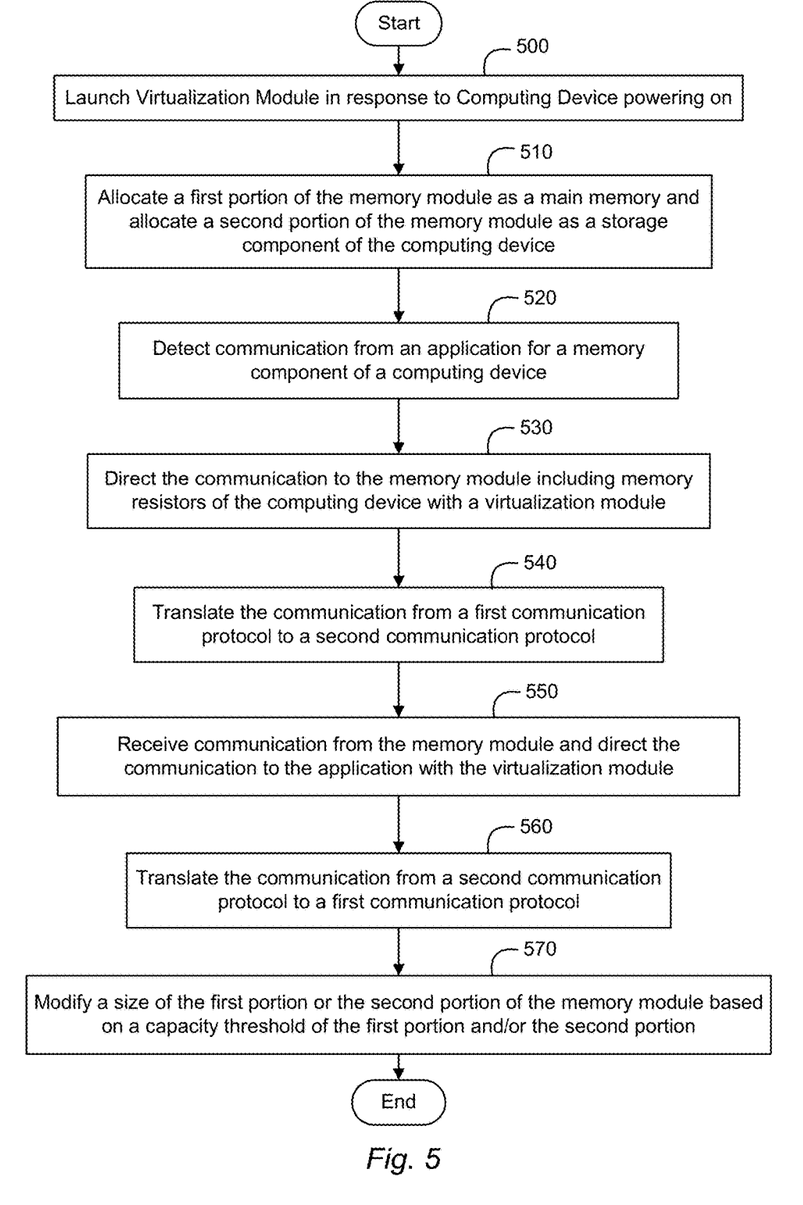
FIG. 5 is a flow chart illustrating a method managing memory according to another example.

FIG. 5 is a flow chart illustrating a method managing memory according to another example. A virtualization module is initially launched in response to the computing device powering on from a power off state at 500. The virtualization module is launched by a processor, controller, and/or a BIOS of the computing device. The virtualization module allocates a first portion of the memory module as a main memory of the computing device and the virtualization module allocates a second portion of the memory module as a storage component of the computing device at 510. In one implementation, an application, such as an operating system of the computing device can also be launched and loaded onto the first portion of the memory module.

The virtualization module detects for communication, such as commands and/or data requests, from the application for the main memory and/or the storage component at 520. If communication is detected for the main memory and/or the storage component from the application, the virtualization module directs the communication to the memory module at 530. In one implementation, the virtualization module further translates and/or modifies the communication from a first communication protocol to a second communication protocol. The first communication protocol can correspond to a communication protocol used by the main memory and/or the storage component and the second communication protocol corresponds to a communication protocol used by the memory module and/or the memory resistors of the memory module.

The memory module can provide communication when responding to commands and/or data requests from the application. The virtualization module receives the communication from the memory module and directs the communication to the application at 550. In one implementation, the virtualization module further translates the communication from the second communication protocol to the first communication protocol at 560. As the virtualization module manages communication between the application and the memory module, the virtualization module can further modify a size of the first portion or a size of the second portion of the memory module or based on whether the first portion and/or the second portion are reaching capacity at 570. The method is then complete. In other embodiments, the method of FIG. 5 includes additional steps in addition to and/or in lieu of those depicted in FIG. 5.

What is claimed is:

1. A computing device comprising:
   a processor;
   a memory module including memory resistors;
   an application to send and receive communication to a memory component in the computing device, the memory component of a first memory type different from a second memory type of the memory module including the memory resistors;
   virtualization instructions executable on the processor to:
      intercept the communication between the application and the memory component and direct the communication to the memory module including the memory resistors that is part of the computing device, and
      direct communication from the memory module including the memory resistors to the application;
      create a data structure that includes addresses of the memory resistors in the memory module, and instructions to execute on respective addresses of the addresses of the memory resistors;
      receive a request containing an address to access the memory component;
      responsive to the request, retrieve, from the data structure, an instruction corresponding to the address in the received request; and
      execute the retrieved instruction with respect to the memory module.

2. The computing device of claim 1, wherein the virtualization instructions comprise a type 1 hypervisor.

3. The computing device of claim 1, wherein the virtualization instructions comprise at least one of a firmware and a Basic Input/Output System of the computing device.

4. The computing device of claim 1, wherein the memory component includes a main memory of the computing device.

5. The computing device of claim 1, wherein the application is selected from among an operating system, a firmware, and a basic input/output system of the computing device.

6. The computing device of claim 1, wherein the communication between the application and the memory component includes a command or a data transfer request between the application and a main memory or storage component of the computing device.

7. A method comprising:
   detecting, by virtualization instructions executed in a computing device, a first communication from an application to a memory component of a first memory type in the computing device;
   directing, by the virtualization instructions, the first communication to a memory module including memory resistors in the computing device, the memory module including the memory resistors being of a second memory type different from the first memory type;
   receiving, by the virtualization instructions, a second communication from the memory module;
   directing, by the virtualization instructions, the second communication to the application;
   creating, by the virtualization instructions, a data structure that includes addresses of the memory resistors in the memory module, and instructions to execute on respective addresses of the addresses of the memory resistors;
   receiving, by the virtualization instructions, a request containing an address to access the memory component;
   responsive to the request, retrieving, by the virtualization instructions from the data structure, an instruction corresponding to the address in the received request; and
   executing, by the virtualization instructions, the retrieved instruction with respect to the memory module.

8. The method of claim 7, further comprising launching the virtualization instructions by a basic input/output system of the computing device in response to the computing device powering on.

9. The method of claim 7, further comprising allocating a first portion of the memory module as a main memory of the computing device, and allocating a second portion of the memory module as a storage component of the computing device.

10. The method of claim 9, further comprising modifying a size of the first portion or the second portion of the memory module based on usage of the first portion or second portion reaching a capacity threshold.

11. The method of claim 7, further comprising translating, by the virtualization instructions, the first communication from a first protocol to a second protocol, a command according to the first protocol used to access the memory component, and a command according to the second protocol used to access the memory resistors of the memory module.

12. A non-transitory computer-readable medium comprising instructions that if executed cause a computing device to:
  in response to the computing device powering on, launch virtualization instructions for a memory module including memory resistors in the computing device;
  in response to detecting a first communication from an application to a memory component in the computing device, redirect, by the virtualization instructions, the first communication to the memory module including the memory resistors, the memory component being of a first memory type different from a second memory type of the memory module including the memory resistors;
  direct, by the virtualization instructions, a second communication from the memory module to the application; and
  create, by the virtualization instructions, a data structure that includes addresses of the memory resistors in the memory module, and instructions to execute on respective addresses of the addresses of the memory resistors;
  receive, by the virtualization instructions, a request containing an address to access the memory component;
  responsive to the request, retrieve, by the virtualization instructions from the data structure, an instruction corresponding to the address in the received request; and
  execute, by the virtualization instructions, the retrieved instruction with respect to the memory module.

13. The non-transitory computer-readable medium of claim 12, wherein the application comprises an operating system to operate as if the operating system is communicating with the memory component of the first memory type, without knowledge that the virtualization instructions are redirecting the first communication to the memory module of the second memory type.

14. The computing device of claim 1, wherein the application comprises an operating system to operate as if the operating system is communicating with the memory component of the first memory type, without knowledge that the virtualization instructions are redirecting the communication to the memory module of the second memory type.

15. The computing device of claim 1, wherein the virtualization instructions are executable on the processor to:
  translate the communication between the application and the memory component from a first protocol to a second protocol, a command according to the first protocol used to access the memory component, and a command according to the second protocol used to access the memory resistors of the memory module.

* * * * *